United States Patent [19]
Kawai et al.

[11] Patent Number: 5,745,201
[45] Date of Patent: Apr. 28, 1998

[54] MATRIX TYPE DISPLAY DEVICE

[75] Inventors: Katsuhiro Kawai, Yamatotakada; Satoshi Yabuta, Nara; Masaya Okamoto, Soraku-gun; Masaru Kajitani, Osaka, all of Japan

[73] Assignee: Sharp Kabushiki Kaisha, Osaka, Japan

[21] Appl. No.: 725,261

[22] Filed: Oct. 2, 1996

[30] Foreign Application Priority Data

Oct. 3, 1995 [JP] Japan ................. 7-256645

[51] Int. Cl.⁶ .............. G02F 1/1335; G02F 1/1333; G02F 1/1343
[52] U.S. Cl. .............. 349/110; 349/106; 349/146
[58] Field of Search .............. 349/110–111, 106–146, 349/192

[56] References Cited

U.S. PATENT DOCUMENTS 5,085,973  2/1992  Shimizu et al. ............. 349/106

FOREIGN PATENT DOCUMENTS

| 524067 | 1/1993 | European Pat. Off. | 349/106 |
| WO 85/04962 | 11/1985 | Japan | 349/111 |
| 4-319913 | 11/1992 | Japan | 349/146 |
| 6-51290 | 2/1994 | Japan | 349/106 |
| 6-82762 | 3/1994 | Japan | 349/106 |
| 6-138456 | 5/1994 | Japan | 349/106 |

OTHER PUBLICATIONS

N. Nakatani, "TFT Matrix Array", Japanese Examined Utility Model Publication (Y2), Publication No. 7–1675, published on Jan. 18, 1995.

N. Nakatani, "TFT Matrix Array", Japanese Examined Utility Model Publication (Y2) Publication No. 7–1676, published on Jan. 18, 1995.

*Primary Examiner*—William L. Sikes
*Assistant Examiner*—Tiep H. Nguyen
*Attorney, Agent, or Firm*—David G. Conlin; David D. Lowry

[57] ABSTRACT

An object of the invention is to facilitate identifying the display color of each pixel during a test process and to apply a correction to a defective switching device in accordance with a test criterion established for each display color. On one transparent substrate, there are formed gate wiring and source wirings intersecting at right angles to each other so that insulation therebetween is maintained, and a pixel electrode and a TFT device are formed for each pixel, thus constructing one substrate member. On another transparent substrate, there is formed a counter electrode facing the pixel electrodes, and identifying means for identifying the display color of each pixel is formed on the side opposite from the side where the counter electrode is formed, the identifying means then being covered with a light-blocking member, thus constructing the another substrate member. The light-blocking member contains openings formed therethrough in portions facing the pixel electrodes. Since the display color of each pixel can be identified using the identifying means, a defective switching device in a pixel can be corrected in accordance with a correction criterion established for each display color.

12 Claims, 17 Drawing Sheets

MATRIX TYPE DISPLAY DEVICE

BACKGROUND OF THE INVENTION

1. Field of the Invention

The present invention relates to a matrix type display device such as an active-matrix driven liquid crystal display device.

2. Description of the Related Art

Examples of matrix type display devices capable of displaying characters and graphics as desired include liquid crystal displays, electroluminescent (EL) displays, and plasma displays. In these matrix type display devices, a plurality of pixels are arranged in a matrix form, and by switching the state of each of the plurality of pixels to either a light or dark display condition, for example, depending on the reflection or absorption of light entering one surface, a desired character or graphic is formed on the display surface. In such display devices, a liquid crystal layer, an EL light emitting layer, or a plasma luminous layer, which serves as a pixel medium, is sandwiched between a pair of substrate members, one having a plurality of pixel electrodes and another having a counter electrode disposed opposite the pixel electrodes. Switching between the light and dark display conditions is accomplished by varying, for example, the magnitude of an electric field formed between a given pixel electrode and the counter electrode and thereby changing the state of the medium sandwiched between the electrodes, that is, by varying the optical property of the medium. The display condition is switched, for example, by changing the orientation of liquid crystal molecules and thereby changing the optical rotatory power of the liquid crystal layer.

An example of such a display device is the active-matrix liquid crystal display. In this type of liquid crystal display, pixel electrodes are formed each independently for each pixel, and switching devices are provided one of each pixel electrode. Each switching device is connected between a pixel electrode and a conductive line provided to transfer a signal applied to the pixel electrode, and operates to individually supply or cut off a signal to the pixel electrode. Such a switching device includes, for example, a three-terminal device such as a thin-film transistor (hereinafter abbreviated as TFT) or a metal-oxide semiconductor (MOS) transistor, or a two-terminal device, such as a metal-insulator-metal (MIM) device, a varistor, or a diode.

FIG. 17 is a partially cutaway view in perspective of a structure of a liquid crystal display 71 according to the prior art. The liquid crystal display 71 uses a reverse-staggered TFT device 82 as the switching device. The liquid crystal display 71 comprises one substrate member 72, another substrate member 73, a liquid crystal layer 74, and polarizers 75 and 76. The liquid crystal layer 74 is sandwiched between the one substrate member 72 and the another substrate member 73, while the polarizers 75 and 76 are respectively mounted on the sides of the substrate members 72 and 73 confronting each other via the liquid crystal layer 74 disposed therebetween. The one substrate member 72 comprises a transparent substrate 77, gate wiring 78, a gate insulating film 79, source wirings 80, pixel electrodes 81, TFT devices 82, and an orientation film 86. Each TFT device 82 includes a gate electrode 83, a source electrode 84, and a drain electrode 85. The another substrate member 73 comprises a transparent substrate 87, a counter electrode 88, a light-blocking member 89, and an orientation film 90.

On one surface of transparent substrate 77, the plurality of gate wirings 78 are formed at intervals and parallel to each other. The gate insulting film 79 is formed on the transparent substrate 77 in such a manner as to cover the gate wirings 78, and on top of the gate insulting film 79, the plurality of source wirings 80 are formed at intervals and at right angles to the gate wirings 78. Rectangular regions formed by the intersection of the gate wirings 78 and source wirings 80 are pixel regions, in each of which each pixel electrode 81 is formed. The TFT devices 82 are each formed for each pixel 95, and connected to the gate wiring 78, source wiring 80, and pixel electrode 81. Each TFT device 82 comprises a gate electrode 83 connected to the gate wiring 78, a source electrode 84 connected to the source wiring 80, and a drain electrode 85 connected to the pixel electrode 81. The orientation film 86 is formed on the transparent substrate 77 in such a manner as to cover the gate wirings 78, gate insulating film 79, source wirings 80, pixel electrodes 81, and TFT devices 82 formed thereon. The one substrate member 72 is thus constructed.

On one surface of the transparent substrate 87, the counter electrode 88 facing the pixel electrodes 81 is formed covering almost the entire surface of the substrate. Further, the orientation film 90, similar to the orientation film 86, is formed over the counter electrode 88. The light-blocking member 89 is formed on the opposite surface of the transparent substrate 87 from the surface thereof where the counter electrode 88 is formed. The light-blocking member 89 has openings 89a formed in the portions thereof opposite the pixel electrodes 81, and acts to block entering light in the other portions, thus obstructing light in other portions than the pixel electrodes 81. In the portions other than where the pixel electrodes 81 and the counter electrode 88 overlap each other, liquid crystal molecules 74a do not align themselves in the same way as they do between the electrodes 81 and 88 when a voltage is applied. Since light passing through these portions is blocked by the light-blocking member 89, display quality improves. Such a light-blocking member 89 may be formed on the same surface of the transparent substrate 87 that faces the liquid crystal layer 74. The another substrate member 73 is thus constructed.

The thus constructed substrate members 72 and 73 are arranged so as to confront each other via the liquid crystal layer 74 disposed therebetween. At this time, the orientation films 86 and 90 disposed closest to the liquid crystal layer 74 are arranged, for example, so that their oriented directions are at right angles to each other. Further, the polarizer 75 disposed at the one substrate member 72 side is arranged so that its light-transmitting axis 75a this aligned in the oriented direction of the orientation film 86. The polarizer 76 disposed at the another substrate member 73 side is arranged so that its light-transmitting axis 76a is aligned in the oriented direction of the orientation film 90.

FIG. 18 is a top plan view showing the substrate member 73 of the liquid crystal display 71. The openings 89a in the light-blocking member 89 are formed in portions facing the pixel electrodes 81; more specifically, when the horizontal direction in the plane of FIG. 18 is assumed to be the row direction, the opening 89a are formed so that the pitch is displayed by ½ between an odd-numbered row and an even numbered row, as shown, that is, in the so-called delta arrangement.

When an electric field is formed that does not reach a threshold voltage at which the orientation state of the liquid crystal molecules 74a between the pixel electrodes 81 and the counter electrode 88 begins to change, the liquid crystal molecules 74a are oriented in such manner as to twist through 90° between the substrate members 72 and 73. In this situation, incident light 91 on the polarizer 75 is polarized by the polarizer 75 into light vibrating only in the direction of the light-transmitting axis 75a of the polarizer 75, and enters the liquid crystal layer 74. The vibration direction of the light is twisted by 90° along the twisted orientation of the liquid crystal molecules 74a to be identical to the direction of the light-transmitting axis 76a of the polarizer 76, and the light passes through the polarizer 76 and emerges as emergent light 92. On the other hand, when an electric field greater than the threshold voltage is applied between the pixel electrodes 81 and the counter electrode 88, the liquid crystal molecules 74a are aligned perpendicularly to the substrate surfaces of the substrate members 72 and 73. At this time, the vibration direction of light entering the liquid crystal layer 74 is no longer twisted by 90° described above, and the light entering the liquid crystal layer 74 reaches the polarizer 76. Since the vibration plane of this light is at right angels to the light-transmitting axis 76a of the polarizer 76, the light is blocked. With these two states, light and dark display conditions can be produced.

In displays having color capability, such as displays for office automation (OA) or displays for audio visual (AV) use, usually color filters are placed on either one substrate member 72 or 73. On the other hand, in the case of color projection display systems, color filters are not provided on neither of substrate members 72 and 73, but instead, red, green, and blue light beams are used as incident light on the display panel.

In a color display having color filters, a color image can be easily produced using white light as a light source. However, when a relatively intense light source, such as those used in projectors, is used, there occurs a problem in terms of color filter durability, causing, for example, color purity degradation. Furthermore, since color filers themselves absorb light, light utilization efficiency drops.

On the other hand, in a display device not provided with color filters, since color filters are not used, light absorption by color filters such as described above does not occur and light utilization efficiency improves. That is, compared with a display device provided with color filters and having the same numerical aperture, color purity is high and a bright display can be obtained. Furthermore, since consideration need not be given to color filter durability, relatively intense light can be used advantageously for projection use. To provide color capability, however, special design considerations are required, such as forming one pixel using three display panels corresponding to the three light beams of red, green, and blue, or converging the red, green, and blue light onto corresponding pixels using a microlens.

Matrix-type displays having the switching devices as described above require a relatively complex manufacturing process. Furthermore, the trend toward larger display size and higher resolution requires increasing the number of pixels, and hence the number of switching devices, but it is extremely difficult to form a very large number of switching devices without defects. Therefore, in the manufacturing process of displays having such switching devices, the switching devices are tested to check whether they are operating properly and whether the desired display results are obtained. If there are switching devices containing imperfections, and the desired display results cannot be obtained, such defective switching devices are corrected using, for example, laser light or the like. Such correction, however, is not applied to all the defective switching devices, but is done based on a correction criterion established for each pixel display color according to the purpose of use. More specifically, test criteria are established specifying, for example, that no defects are allowed for green pixels which are relatively easily visible, but for blue pixels which are relatively not visible, up to two defectives are allowed, for example, if they are located near the edges of the display panel. Corrections are applied in accordance with such correction criteria. In correcting a pixel, therefore, it is necessary to recognize the display color of the pixel.

FIG. 19 is a plan view of the substrate member 72 for explaining a test method for defective pixels on a display device having color filters. For a display device having color filters, after the substrate members 72 and 73 are bonded together with the liquid crystal layer 74 sandwiched between them, a test is performed by applying the same gate signal and the same source signal to the gate wirings 78 and source wirings 80, respectively, and thereby driving all the pixels 95 simultaneously. Here, gate terminals 78a each formed at one end of each of the plurality of gate wirings 78 are all connected common to a gate-side short-circuit line 93, while terminals 80a each formed at one end of each of the plurality of source wirings 80 are all connected common to a source-side short-circuit line 94. Therefore, by applying the signals via the short-circuit lines 93 and 94, the test can be done easily. The short-circuit lines 93 and 94 are provided to prevent destruction due to electrostatic discharge that may occur during the manufacturing process. In the case of a display device having color filters, the presence of the color filters makes it easy to distinguish the display color of each pixel. However, when testing display devices having color filters, a color sensor for detecting the display colors produced through the color filters is required.

On the other hand, in the case of a display device not provided with color filters, such as the one shown in FIG. 17, it is not easy to recognize the display color of each pixel 95. For example, in the case of a single-plate projection display, the display color of each pixel cannot be identified until a complete set of optics is assembled in the system. When testing for defects after the substrate members 72 and 73 are assembled together with the liquid crystal layer 74 sandwiched between them, as in the case of the display device having color filters described above, a structure for applying external signals has to be provided, for example, by mounting a driver for applying an independent signal to each pixel, or by forming connection terminals using needle-tipped probes or the like on the gate wirings 78 or source wirings 80. With this structure, the test can be performed by applying signals corresponding to the red, green, and blue light, without displaying each color.

However, when a driver is mounted, if the substrate with the driver mounted thereon is rendered defective, the driver will be wasted. On the other hand, when connection terminals are formed using needle-tipped probes or the like, specialized equipment for probing will become necessary. In this way, in testing for defects in process with the liquid crystal layer 74 sandwiched between the substrate members 72 and 73, if defects are found, the materials and labor used for the test will be wasted. It is therefore desirable to find defects at a stage before the substrate members 72 and 73 are assembled together with the liquid crystal layer 74 sandwiched between them.

In Japanese Utility Patent Publication Nos. 7-1675 and 7-1676, an example of a display device is disclosed wherein number patterns are impressed for the terminals formed at the ends of conductive lines so that the address of a defective pixel can be determined. While the technique disclosed in these patents makes it possible to determine the address of a pixel and identify the display color of the pixel, it takes a relatively long time to determine the pixel address.

SUMMARY OF THE INVENTION

It is an object of the present invention to provide a matrix type display device capable of easily identifying a display color of each pixel during a test process and correcting a switching device in accordance with a correction criterion established for each display color, or determining an absolute position of a defective pixel on a substrate in an efficient and simple manner and capable of conducting a test and correction to be done in a short time with ease.

The invention provides a matrix type display device comprising:

one substrate member comprising gate wirings arranged at intervals in parallel to each other, source wirings arranged at right angles with the gate wirings so that insulation therebetween is maintained, a plurality of pixel electrodes arranged for each rectangular pixel formed by the intersection of the gate and source wirings, and switching devices which individually connect the pixel electrodes to the gate and source wirings; and another substrate member comprising a counter electrode facing the pixel electrodes, and a light-blocking member containing openings at least in regions thereof facing the pixel electrodes;

wherein either the one substrate member or the another substrate member has identifying means for identifying the pixels.

According to the invention, since identifying means for identifying the pixels is formed, the absolute position or display color or the like of each pixel can be identified using the identifying means. Accordingly, a defective switching device can be corrected in a short time in accordance with a correction criterion established, for example, for each pixel.

Further the invention is characterized in that a display color for each pixel is predetermined, and the identifying means serves as a guide to recognize the display color or absolute position of a pixel with high accuracy.

According to the invention, since the identifying means for identifying a pixel display color is formed, the display color or absolute position of each pixel can be identified using the identifying means. Accordingly, a defective switching device can be corrected in a short time, for example, in accordance with a correction criterion established for each pixel.

More specifically, the one substrate member of the matrix type display device comprises the gate and source wirings arranged at right angles to each other so that insulation therebetween is maintained, the plurality of pixel electrodes each provided for each pixel, and switching devices individually connecting the pixel electrodes to the gate and source wirings, and the another substrate member comprises the counter electrode facing the pixel electrodes, and the light-blocking member containing openings at least in regions thereof facing the pixel electrodes. In such a matrix type display device, defective pixels occur attributable to the switching devices. The switching device for such a defective pixel is corrected in accordance with a correction criterion established for each pixel display color in the case of a color display device. To achieve this, it is required to distinguish the display color of the pixel. Since the display color of the pixel can be identified using the identifying means, the correction of the defective switching device can be performed easily in accordance with the predetermined correction criterion without having to apply complicated test signals or form special connection terminals. This serves to simplify the test and correction process, improve the manufacturing efficiency, and reduce the manufacturing cost.

Further, the invention is characterized in that the identifying means is provided on the another substrate member.

According to the invention, since the display color or absolute position of each pixel can be identified in the same manner as described above, using the identifying means provided on the another substrate member, the switching device for a defective pixel can be corrected in accordance with the predetermined correction criterion. Accordingly, the test and correction process can be simplified.

Further, the invention is characterized in that the light-blocking member is formed in such a manner as to cover the identifying means.

According to the invention, bumps are formed on the surface of the light-blocking member due to the presence of the identifying means, and the bumps are useful for recognition of display colors or absolute positions of the pixels. Accordingly, the switching device for a defective pixel can be corrected in accordance with the predetermined correction criterion.

Further, the invention is characterized in that the identifying means is formed by patterning portions of the light-blocking member.

According to the invention, since the display color or absolute position of each pixel can be identified using the identifying means formed by patterning portions of the light-blocking member, the switching device for a pixel causing a display defect can be corrected in accordance with the predetermined correction criterion. Such identifying means can be formed simultaneously with the pattern formation of the light-blocking member.

Further the invention is characterized in that the identifying means is a notch formed in each opening of the light-blocking member.

According to the invention, since the display color or absolute position of each pixel can be identified even with such identifying means, the switching device for a defective pixel can be corrected in accordance with the predetermined correction criterion. Such identifying means can be formed simultaneously with the pattern formation of the light blocking member.

Further, the invention is characterized in that the identifying means is a projection piece formed in each opening of the light-blocking member.

According to the invention, since the display color or absolute position of each pixel can be identified even with such identifying means, the switching device for a defective pixel can be corrected in accordance with the predetermined correction criterion. Such identifying means can be formed simultaneously with the pattern formation of the light-blocking member.

Further, the invention is characterized in that the identifying means is provided on the one substrate member.

According to the invention, since the display color or absolute position of each pixel can be identified in the same manner as described above, using the identifying means provided on the one substrate member, the switching device for a defective pixel can be corrected in accordance with the predetermined correction criterion. Accordingly, the test and correction process can be simplified.

Further, the invention is characterized in that the gate wirings or source wirings are formed in such a manner as to cover the identifying means.

According to the invention, bumps are formed on the surface of the gate wirings or source wirings due to the presence of the identifying means, and the bumps are useful for recognition of the display colors or absolute positions of the pixels. Accordingly, the switching device for a defective pixel can be corrected in accordance with the predetermined correction criterion.

Further, the invention is characterized in that the identifying means is formed by patterning portions of the gate wirings or source wirings.

According to the invention, since the display color or absolute position of each pixel can be identified using the identifying means formed by patterning portions of the gate wirings or source wirings, the switching device for a defective pixel can be corrected in accordance with the predetermined correction criterion. Such identifying means can be formed simultaneously with the pattern formation of the gate wirings or source wirings.

Further, the invention is characterized in that the identifying means is a notch formed in each gate wiring or source wiring.

According to the invention, since the display color or absolute position of each pixel can be identified even with such identifying means, the switching device for a defective pixel can be corrected in accordance with the predetermined correction criterion. Such identifying means can be formed simultaneously with the pattern formation of the gate wirings or source wirings.

Further the invention is characterized in that the identifying means is a projection piece formed in each gate wiring or source wiring.

According to the invention, since the display color or absolute position of each pixel can be identified even with such identifying means, the switching device for a defective pixel can be corrected in accordance with the predetermined correction criterion. Such identifying means can be formed simultaneously with the pattern formation of the gate wirings or source wirings.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
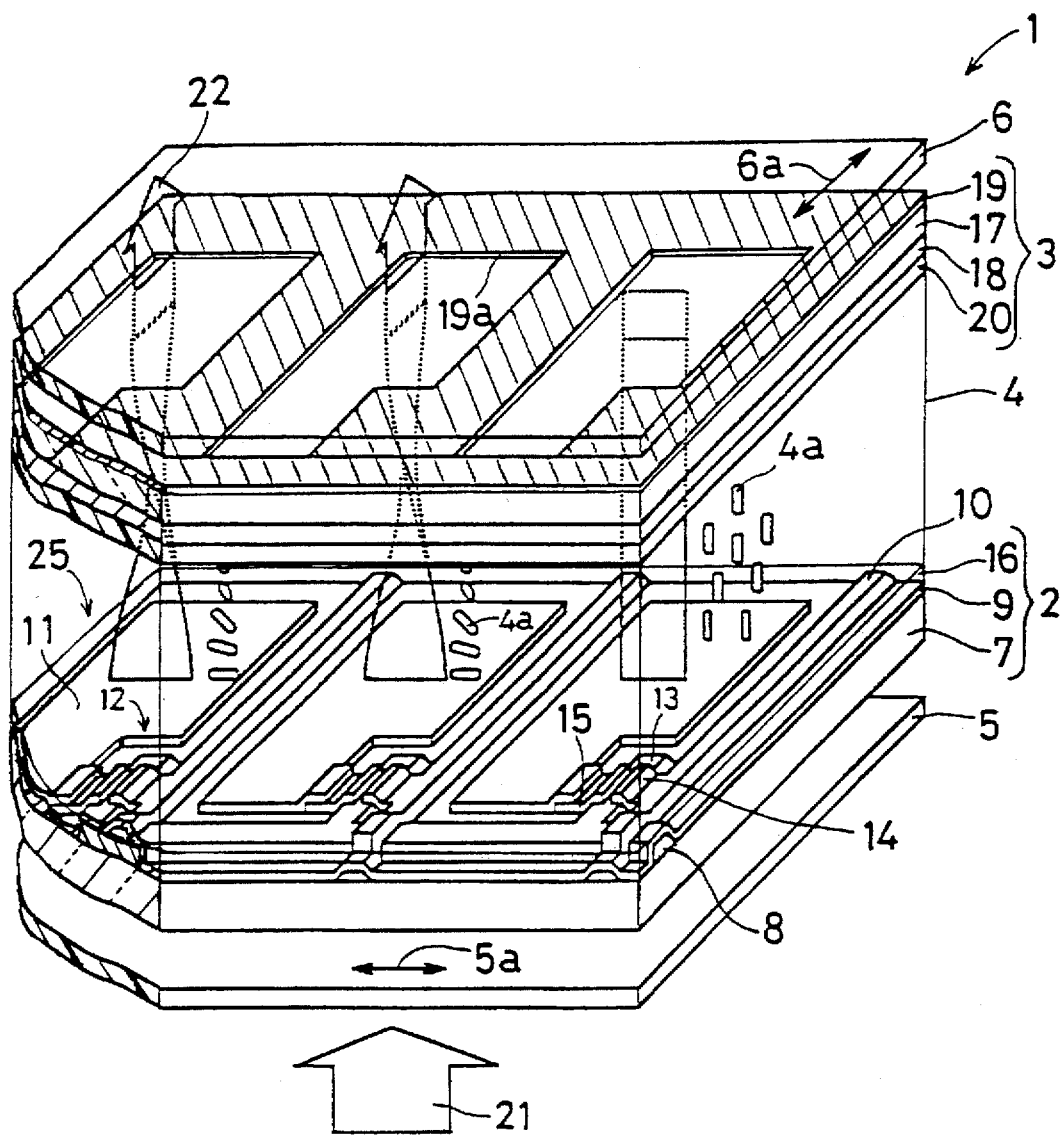
FIG. 1 is a partially cutaway view in perspective of a structure of a liquid crystal display 1 according to a first embodiment of the invention.

Now referring to the drawings, preferred embodiments of the invention are described below.

FIG. 1 is a partially cutaway view in perspective of a structure of a liquid crystal display 1 according to a first embodiment of the present invention. The liquid crystal display 1 uses a reverse-staggered TFT device 12 as the switching device. The liquid crystal display 1 comprises one substrate member 2, another substrate member 3, a liquid crystal layer 4, and polarizers 5 and 6. The liquid crystal layer 4 is sandwiched between the one substrate member 2 and the another substrate member 3, while the polarizers 5 and 6 are respectively mounted on the sides of the substrate members 2 and 3 opposite from the liquid crystal layer 4. The one substrate member 2 comprises a transparent substrate 7, gate wirings 8, a gate insulating film 9, source wirings 10, pixel electrodes 11, TFT devices 12, and an orientation film 16. Each TFT device 12 includes a gate electrode 13, a source electrode 14, and a drain electrode 15. The another substrate member 3 comprises a transparent substrate 17, a counter electrode 18, a light-blocking member 19, and an orientation film 20.

On one surface of the transparent substrate 7, the plurality of gate wirings 8 are formed evenly spaced and parallel to each other. The gate insulating film 9 is formed on the transparent substrate 7 in such a manner as to cover the gate wirings 8, and on top of the gate insulating film 9, the plurality of source wirings 10 are formed at equally spaced intervals and at right angles to the gate wirings 8. Rectangular regions formed by the intersection of the gate wirings 8 and source wirings 10 are the pixel regions, in each of which each pixel electrode 11 is formed. The TFT devices 12 are each formed for each pixel 25, and connected to the gate wiring 8, source wiring 10, and pixel electrode 11. Each TFT device 12 comprises a gate electrode 13 connected to the gate wiring 8, a source electrode 14 connected to the source wiring 10, and a drain electrode 15 connected to the pixel electrode 11. The orientation film 16 is formed on the transparent substrate 17 in such a manner as to cover the gate wirings 8, gate insulating film 9, source wirings 10, pixel electrodes 11, and TFT devices 12 formed thereon. The one substrate member 2 is thus constructed.

On one surface of the transparent substrate 17, the counter electrode 18 facing the pixel electrodes 11 is formed covering almost the entire surface of the substrate. Further, the orientation film 20, similar to the orientation film 16, is formed over the counter electrode 18. The light-blocking member 19 is formed on the opposite surface of the transparent substrate 17 from the surface thereof where the counter electrode 18 is formed. The light-blocking member 19 has openings 19a formed at least in the portions thereof opposite the pixel electrodes 11, and acts to block entering light in the other portions, thus obstructing light in other portions than the pixel electrodes 11. In the portions other than where the pixel electrodes 11 and the counter electrode 18 overlap each other, liquid crystal molecules 4a do not align themselves in the same way as they do in the overlapping portions of the electrodes 11 and 18 when a voltage is applied. Since light passing through the above portions is blocked by the light-blocking member 19, display quality improves. Such a light-blocking member 19 may be formed on the same surface of the transparent substrate 17 that faces the liquid crystal layer 4. The another substrate member 3 is thus constructed.

The thus constructed substrate members 2 and 3 are arranged so as to confront each other via the liquid crystal layer 4 disposed therebetween. At this time, the orientation films 16 and 20 disposed closest to the liquid crystal layer 4 are arranged, for example, so that their oriented directions are at right angles with each other. Further, the polarizer 5 disposed at the one substrate member 2 side is arranged so that its light-transmitting axis 5a is aligned in the oriented direction of the orientation film 16. The polarizer 6 disposed at the another substrate member 3 side is arranged so that its light-transmitting axis 6a is aligned in the oriented direction of the orientation film 20.

When an electric field is formed that does not reach a threshold voltage at which the orientation state of the liquid crystal molecules 4a between the pixel electrodes 11 and the counter electrode 18 begins to change, the liquid crystal molecules 4a are oriented in such a manner as to twist through 90° between the substrate members 2 and 3. In this situation, incident light 21 on the polarizer 5 is polarized by the polarizer 5 into light vibrating only in the direction of the light-transmitting axis 5a of the polarizer 5, and enters the liquid crystal layer 4. The vibration direction of the light is twisted by 90° along the twisted orientation of the liquid crystal molecules 4a to be identical to the direction of the light-transmitting axis 6a of the polarizer 6, and the light passes through the polarizer 6 and emerges as emergent light 22. On the other hand, when an electric field greater than the threshold voltage is applied between the pixel electrodes 11 and the counter electrode 18, the liquid crystal molecules 4a are aligned perpendicularly to the substrate surfaces of the substrate members 2 and 3. At this time, the vibration direction of light entering the liquid crystal layer 4 is no longer twisted by 90° as mentioned above, and the light reaches the polarizer 6. Since the vibration plane of this light is at right angles to the light-transmitting axis 6a of the polarizer 6, the light is blocked. With these two states, light and dark display conditions can be produced.

Figure 2:
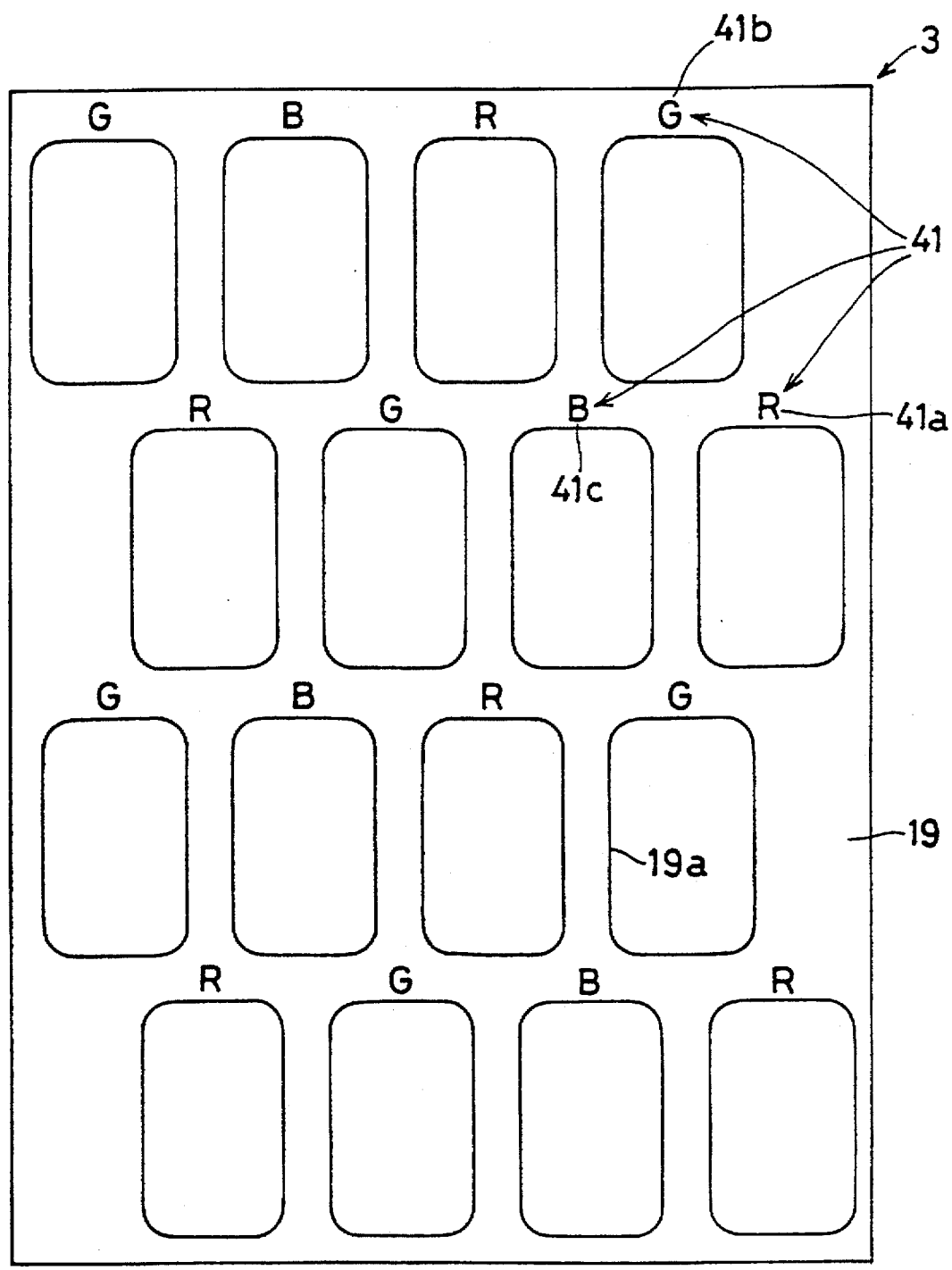
FIG. 2 is a plan view of a substrate member 3 in the liquid crystal device 1.

FIG. 2 is a plan view of the substrate member 3 in the liquid crystal display 1. The light-blocking member 19 is formed on the surface of the transparent substrate 17 opposite from the surface facing the liquid crystal layer 4. The openings 19a are formed in the light-blocking member 19 in regions facing the pixel electrodes 11 formed on the substrate member 2. The substrate member 3 also has identifying means 41 indicating the display color of each pixel 25.

In this embodiment, an aluminum film is deposited over the surface of the transparent substrate 17, and then character patterns that serve as the identifying means 41 are formed using photolithography. After that, the light-blocking member 19 is formed by first depositing a chrome film over the surface of the transparent substrate 17 to cover the identifying means 41, and then patterning the openings 19a. Since the light-blocking member 19 is formed covering the identifying means 41, steps are formed between the portions where the light-blocking member 19 overlaps the identifying means 41 and their adjacent portions. These steps enable the identifying means 41 to be recognized by an image recognition device or visually, for example, with the aid of an optical microscope.

In this embodiment, character patterns of "R", "G", and "B" corresponding to the display colors of red, green, and blue are formed as the identifying means 41a to 41c. Further, although the identifying means 41 is formed from an aluminum film and the light-blocking member 19 from a chrome film, it will be appreciated that the identifying means 41 and the light-blocking member 19 are not restricted to these particular materials but may be formed from other metals than aluminum or chrome or from resins or the like. Furthermore, the patterns of the identifying means 41 are not limited to the above-described patterns, but any other pattern may be used as long as the pattern is useful for recognition of the display color of each pixel.

A test is performed by applying the same gate signal to all the gate wirings 8 and the same source signal to all the source wirings 10 and thereby driving all the pixels 25 to check the TFT devices 12 for defects and hence defective pixels; with the identifying means 41 provided as described above, if a defective pixel is found, the display color of the defective pixel can be checked using the identifying means 41, and the defect in the TFT device 12 can be corrected in accordance with the correction criterion established for each display color. Therefore, there is no need to mount a driver or to form connection terminals using needle-tipped probes or the like, which was the case with the prior art. This serves to simplify the test process, improve the manufacturing efficiency, and reduce the manufacturing cost.

Figure 3:
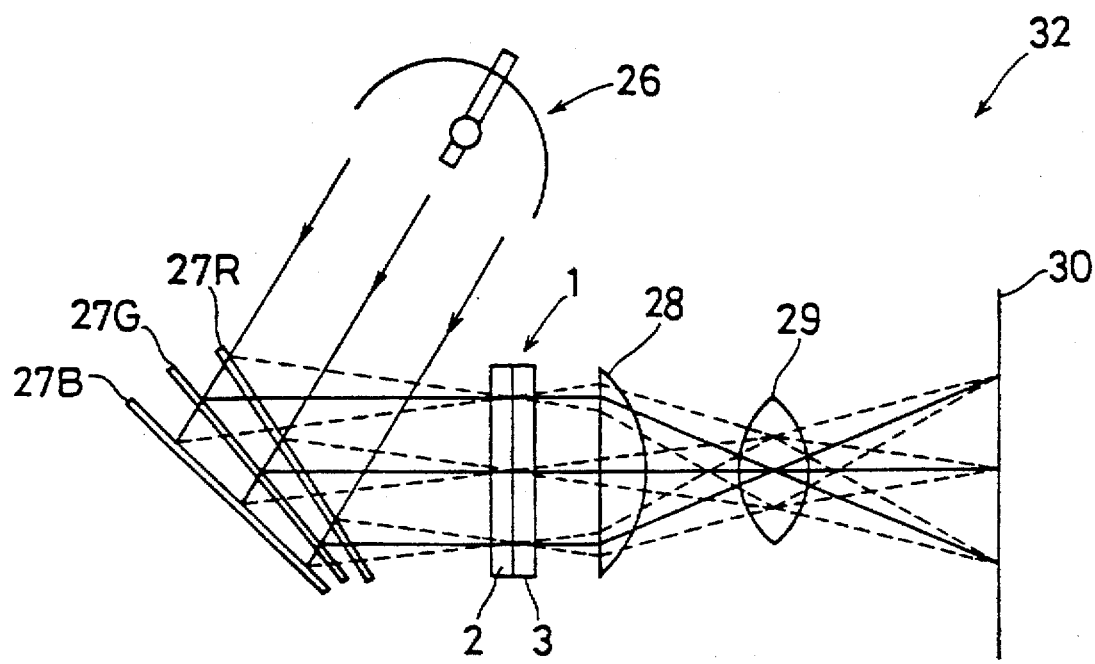
FIG. 3 is a side view of a construction of a projection display apparatus 32 using the liquid crystal display 1.
Figure 4:
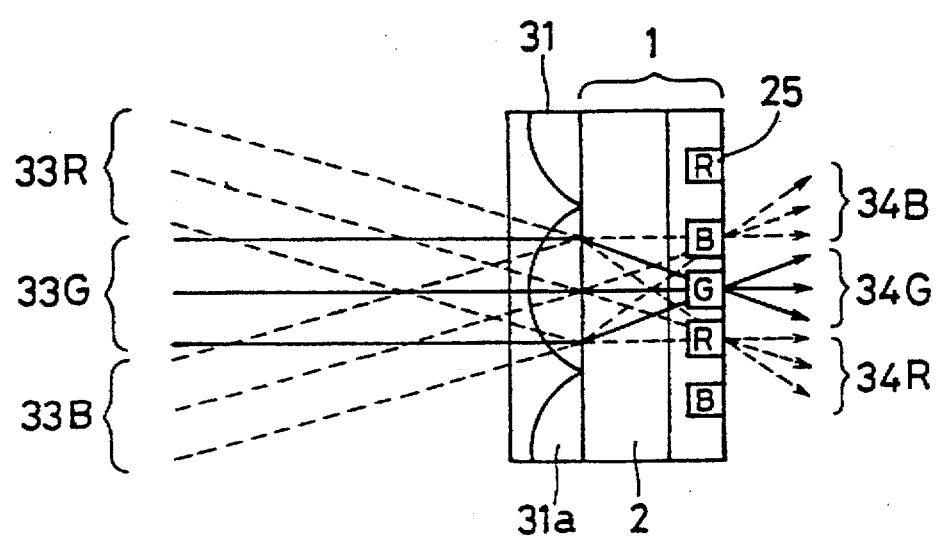
FIG. 4 is an enlarged side view of a portion of the liquid crystal display 1 in the projection display apparatus 32.

FIG. 3 is a side view of a construction of a projection display apparatus 32 using the liquid crystal display 1. FIG. 4 is an enlarged side view of the liquid crystal display 1 and microlens array 31 in the projection display apparatus 32. Light from a light source 26 is split into the red, green, and blue light by a red reflecting dichroic mirror 27R, which reflects light in the red wavelength band and transmits other light, a green reflecting dichroic mirror 27G, which reflects light in the green wavelength band and transmits other light, and a blue reflecting dichroic mirror 27B, which reflects light in the blue wavelength band and transmits other light. The microlens array 31 consisting of a plurality of microlenses 31a is placed on the surface of the substrate member 2, the light entrance surface, of the liquid crystal display 1. The microlenses 31a in the microlens array 31 are arranged so that each microlens 31a corresponds to a set of pixels 25 of the three display colors, red, green, and blue. The red, green, and blue light beams, 33R, 33G, and 33B, separated by the dichroic mirrors, 27R, 27G, and 27B, are converged by the microlens 31a in the microlens array 31 onto the pixels of the red, green, and blue display colors, respectively. The beams then emerge as red, green, and blue emergent light beams, 34R, 34G, and 34B, respectively. With the emergent light beams is irradiated a predetermined screen 30 through a fresnel lens 28 and a projection lens 29.

The liquid crystal display 1, built-into the above-constructed projection display apparatus 32, is thus capable of producing a projection color image.

Figure 5:
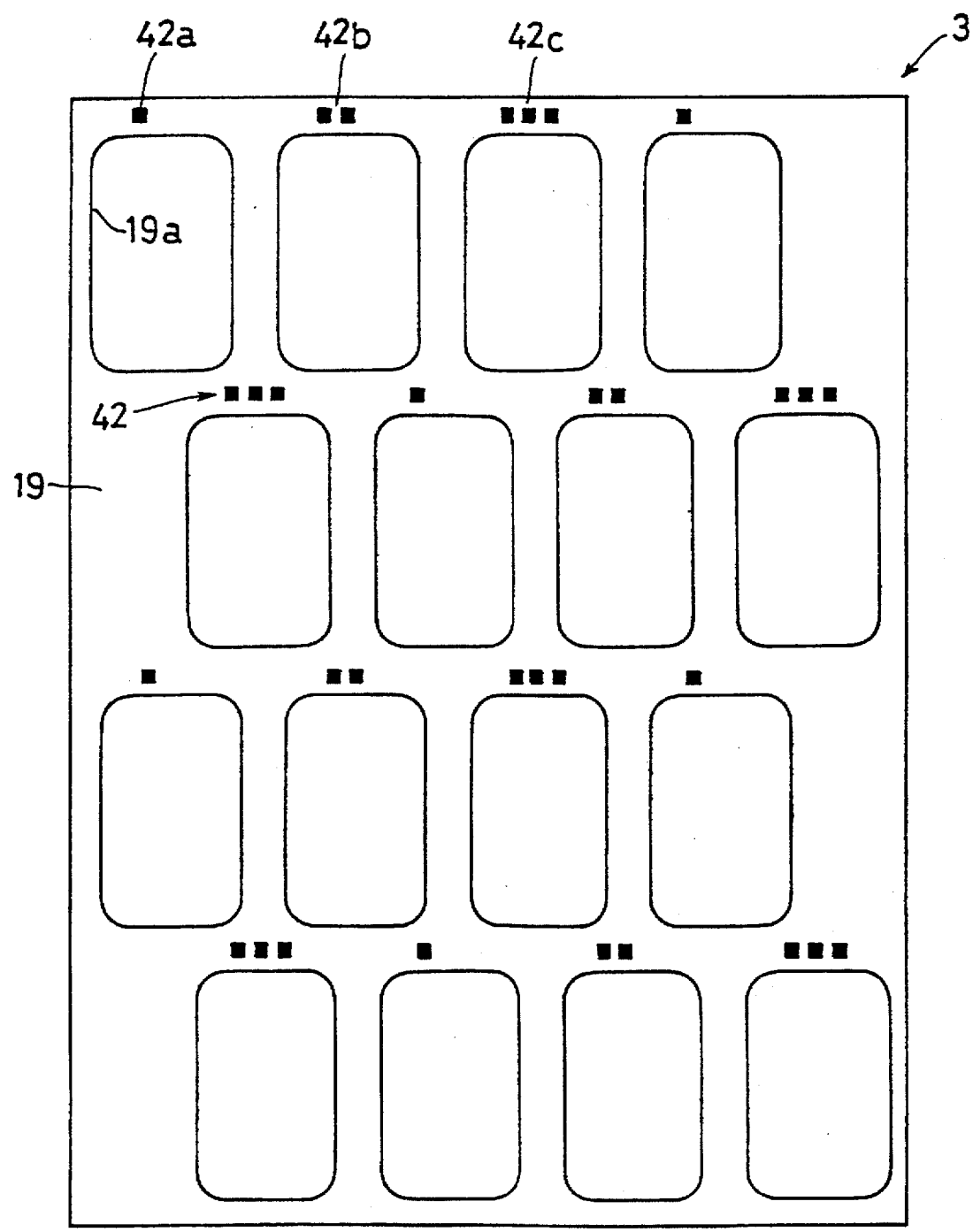
FIG. 5 is a plan view of the substrate member 3 in a liquid crystal display according to a second embodiment of the invention.

FIG. 5 is a plan view of the substrate member 3 in a liquid crystal display according to a second embodiment of the invention. The liquid crystal display of the second embodiment is characterized by the provision of identifying means 42 replacing the identifying means 41 in the liquid crystal display 1; in other respects, the structure is the same as the liquid crystal display 1. In FIG. 5, the elements constructed in the same manner as in the liquid crystal display 1 are designated by the same reference numerals. The identifying means 42 employs graphic patterns having, for example, a rectangular shape, as shown, rather than the character patterns used as the identifying means 41. The number of rectangular patterns used is changed in corresponding relationship with red, green, and blue. In this embodiment, one, two, and three patterns are used correspondingly. With these identifying means 42a to 42c also, the test and correction can be performed in the same manner as in the first embodiment. Accordingly, this also serves to simplify the test process, improve the manufacturing efficiency, and reduce the manufacturing cost.

Figure 6:
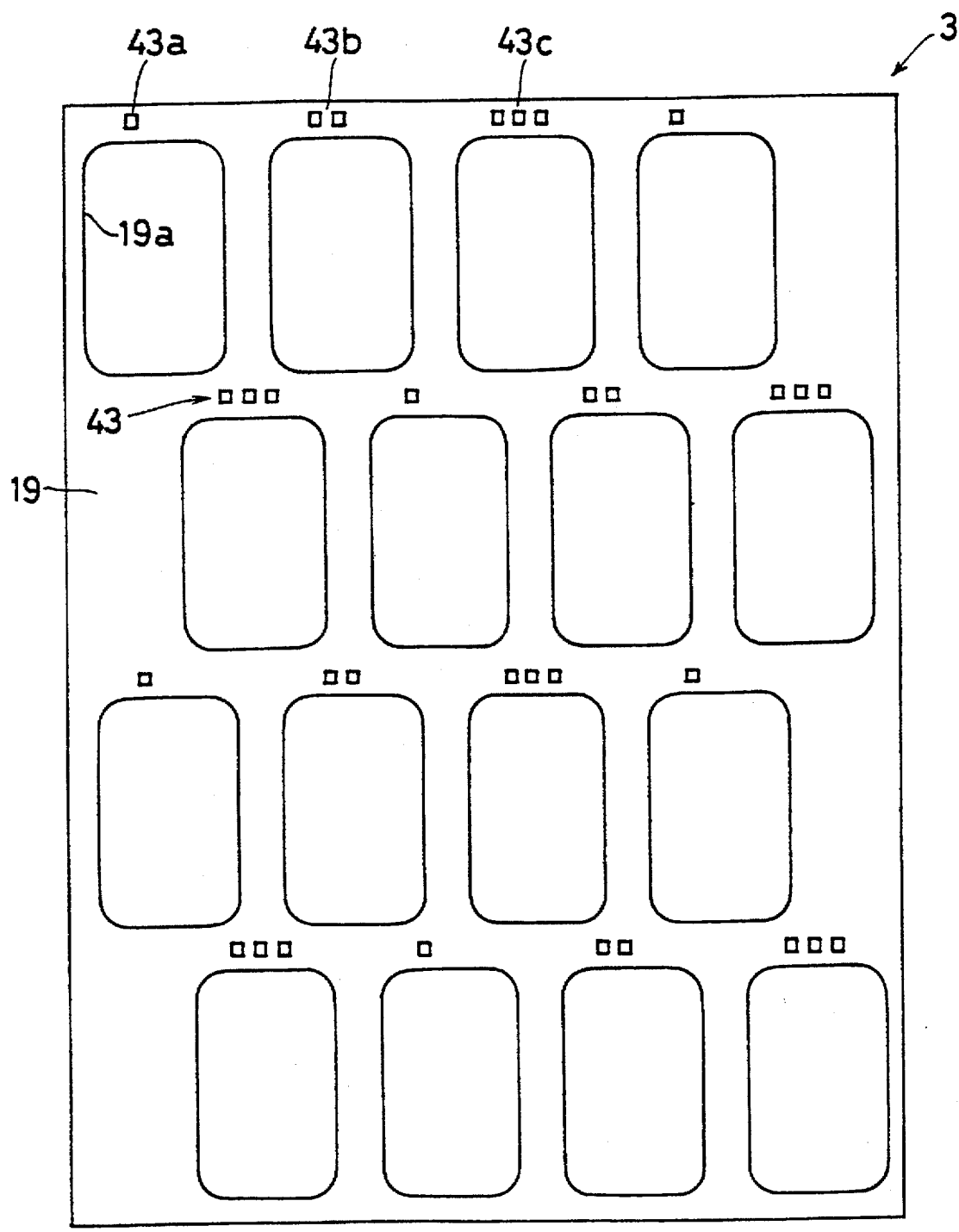
FIG. 6 is a plan view of the substrate member 3 in a liquid crystal display according to a third embodiment of the invention.

FIG. 6 is a plan view of the substrate member 3 in a liquid crystal display according to a third embodiment of the invention. The liquid crystal display of the third embodiment is characterized by the formation of identifying means 43 which is formed by patterning portions of the light-blocking member 19. In other respects, the structure is the same as the liquid crystal display 1 of the first embodiment. For example, as shown in the figure, identifying means 43a to 43c, consisting of openings having a rectangular shape such as described above, are formed by patterning for the respective display colors. Such identifying means 43 can be formed simultaneously with the openings 19a.

Figure 7:
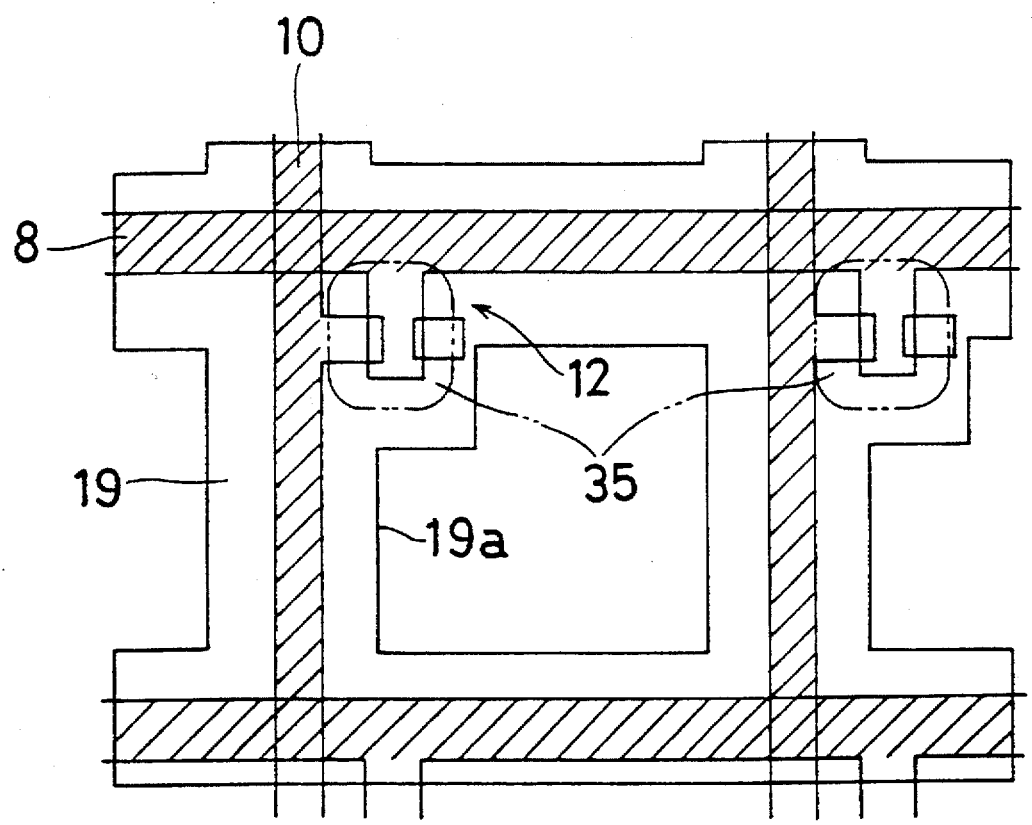
FIG. 7 is a diagram showing regions where identifying means 43 can be formed.

FIG. 7 is a plan view of regions where the identifying means 43 can be formed. The identifying means 43, constructed by forming openings in the light-blocking member 19, should preferably be formed in regions overlapping the gate wirings 8 and source wirings 10 formed on the substrate member 2 (the regions indicated by oblique hatching in FIG. 7) in order to avoid light leakage from the openings. Further, when the TFT device 12 is used as the switching device, as in the present embodiment, since the switching characteristic of the TFT device varies in response to relatively intense light, it is desirable that the identifying means 43 not be formed in a region 35 facing the TFT device 12 (the region enclosed by a dashed line).

With such identifying means 43 also, the test and correction can be performed in the same manner as previously described. Accordingly, this also serves to simplify the test process, improve the manufacturing efficiency, and reduce the manufacturing cost.

Figure 8:
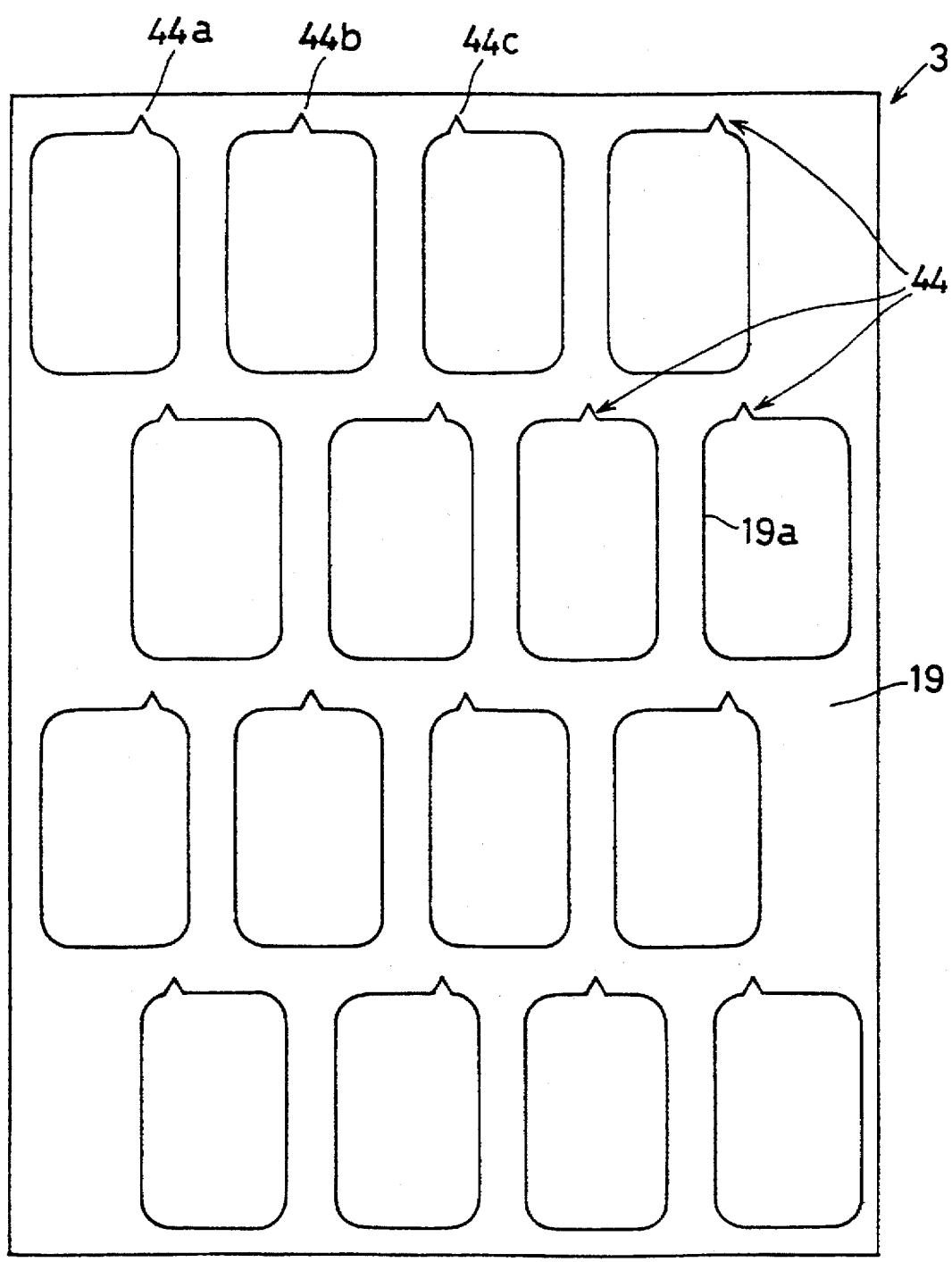
FIG. 8 is a plan view of the substrate member 3 in a liquid crystal display according to a fourth embodiment of the invention.

FIG. 8 is a plan view of the substrate member 3 in a liquid crystal display according to a fourth embodiment of the invention. The liquid crystal display of the fourth embodiment is characterized by the formation of identifying means 44 which is a notch formed in each opening 19a of the light-blocking member 19. In other respects, the structure is the same as the liquid crystal display 1 of the first embodiment. The position of the notch formed is changed in corresponding relationship with red, green, and blue. Accordingly, the display color of each pixel can be identified by the identifying means, 44a to 44c, having different notch positions. The notch should be formed in a size enough to be recognized visually with the aid of an optical microscope or the like, and should preferably be made as small as possible as long as it is recognizable. Further, it is preferable that the pixel electrode 11 be also disposed in a portion facing the notch.

With the identifying means 44 formed from such a notch also, the test and correction can be performed in the same manner as previously described. Accordingly, this also serves to simplify the test process, improve the manufacturing efficiency, and reduce the manufacturing cost.

Figure 9:
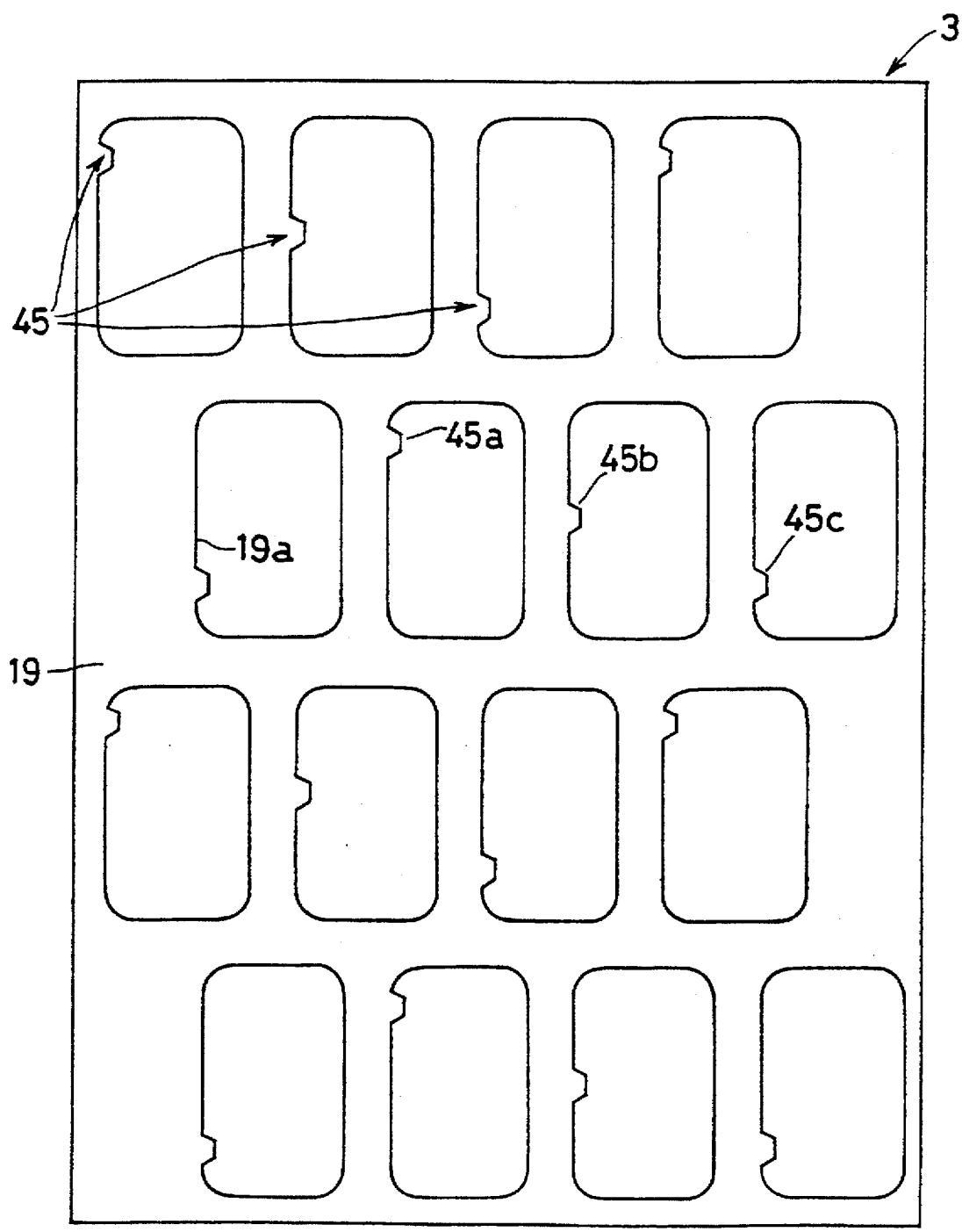
FIG. 9 is a plan view of the substrate member 3 in a liquid crystal display according to a fifth embodiment of the invention.

FIG. 9 is a plan view of the substrate member 3 in a liquid crystal display according to a fifth embodiment of the invention. The liquid crystal display of the fifth embodiment is characterized by the formation of identifying means 45 which is a projection piece formed in each opening 19a of the light-blocking member 19. In other respects, the structure is the same as the liquid crystal display 1 of the first embodiment. The position of the projection piece formed is changed in corresponding relationship with red, green, and blue. For the identifying means 45a to 45c having different projection piece positions also, it is preferable that the size be made as small as possible as long as the projection piece is recognizable, as in the identifying means 44 in the fourth embodiment.

With the identifying means 45 formed from such a projection piece also, the test and correction can be performed in the same manner as previously described. Accordingly, this also serves to simplify the test process, improve the manufacturing efficiency, and reduce the manufacturing cost.

Figure 10:
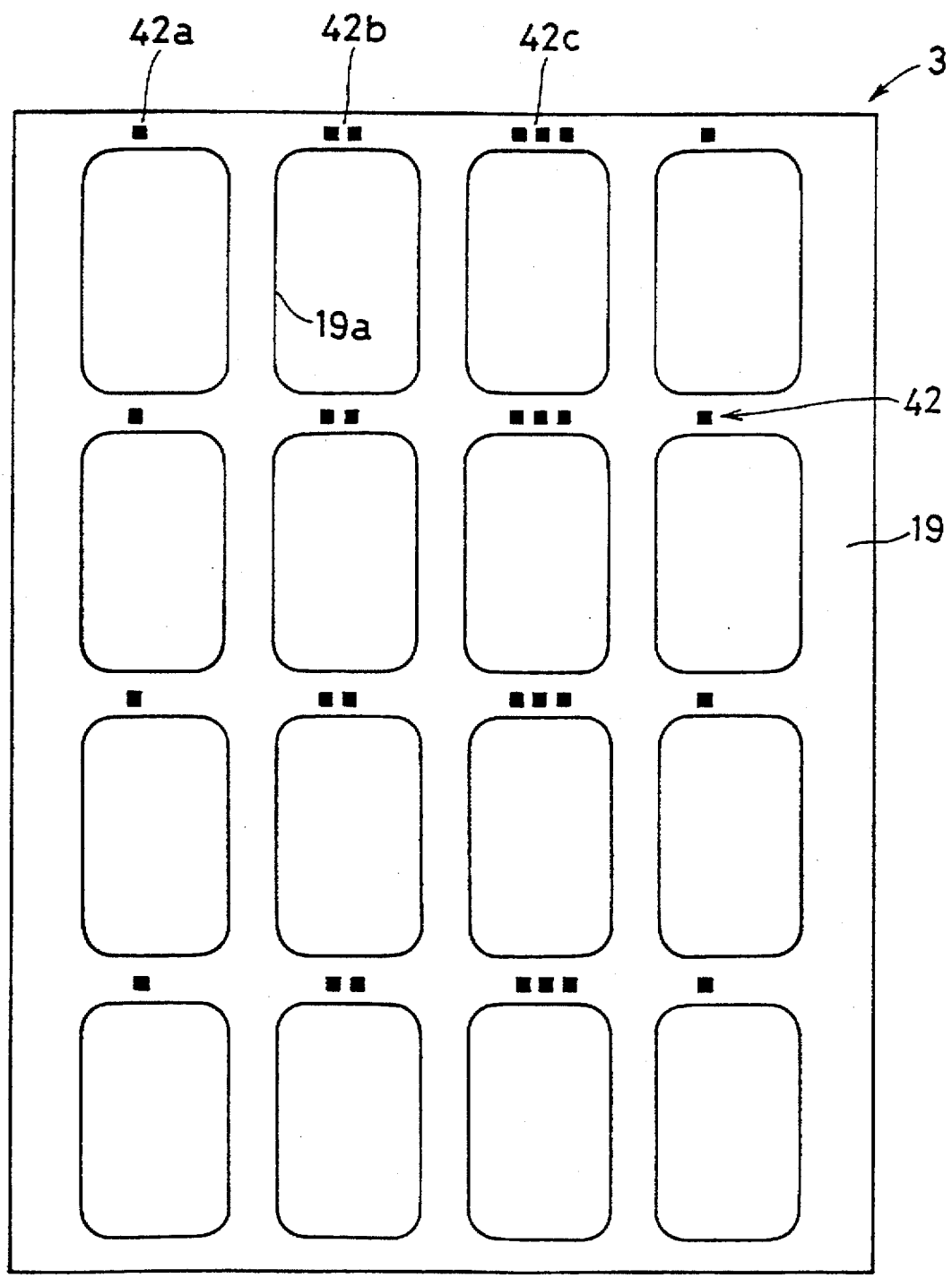
FIG. 10 is a plan view of the substrate member 3 in a liquid crystal display according to a sixth embodiment of the invention.

FIG. 10 is a plan view of the substrate member 3 in a liquid crystal display according to a sixth embodiment of the invention. The foregoing first to fifth embodiments have been described dealing with an example in which the red, green, and blue pixels are disposed in the so-called delta arrangement. By contrast, the sixth embodiment is characterized by disposing the pixels in the so-called stripe arrangement; in other respects, the structure is the same as the liquid crystal display 1 of the first embodiment. More specifically, the sixth embodiment is characterized in that the pixels producing red, green, and blue colors are arranged in the column direction, that is, in the vertical direction in the plane of FIG. 10, without being displaced from each other. In such a pixel arrangement also, by forming any one of the identifying means 41 to 45 described in the first to fifth embodiments, the test and correction can be performed in the same manner as previously described. In FIG. 10, the identifying means 42 described in the second embodiment is formed.

Figure 11:
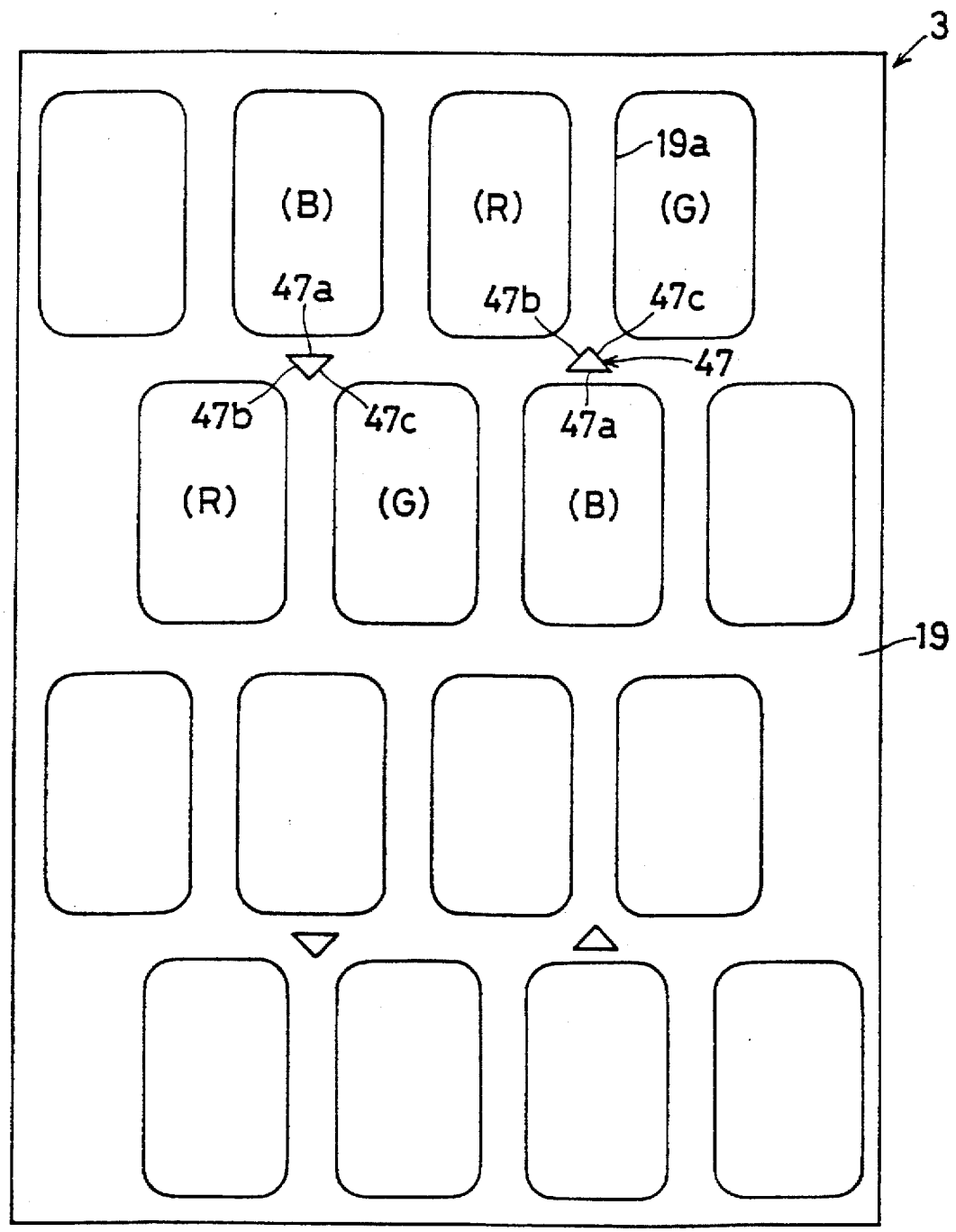
FIG. 11 is a plan view of the substrate member 3 in a liquid crystal display according to a seventh embodiment of the invention.

FIG. 11 is a plan view of the substrate member 3 in a liquid crystal display according to a seventh embodiment of the invention. The liquid crystal display of the seventh embodiment is characterized by the provision of identifying means 47 replacing the identifying means 41 to 45; in other respects, the structure is the same as the liquid crystal display 1 of the first embodiment. The identifying means 47 in this embodiment is provided one for each set of pixels of the three display colors, red, green, and blue. Also, it is formed in a rectangular shape, as shown. Each rectangle is formed with its three sides 47a to 47c, facing the openings 19a corresponding to the red, green, and blue pixels.

For example, the side 47a, facing upward or downward in the plane of FIG. 11, is positioned in such a manner as to point to the opening 19a corresponding to the blue (B) pixel. The side 47b, facing leftward in the plane of FIG. 11, is positioned in such a manner as to point to the opening 19a corresponding to the red (R) pixel. Likewise, the side 47c, facing rightward in the plane of FIG. 11, is positioned in such a manner as to point to the opening 19a corresponding to the green (G) pixel.

With such identifying means 47 also, the display color of each pixel can be identified, and the test and correction as previously described can be performed, serving to simplify the manufacturing process. This also improves the manufacturing efficiency and reduces the manufacturing cost. Furthermore, the reduced number of identifying means 47 contributes to savings in the time and labor required to form the identifying means 47.

Figure 12:
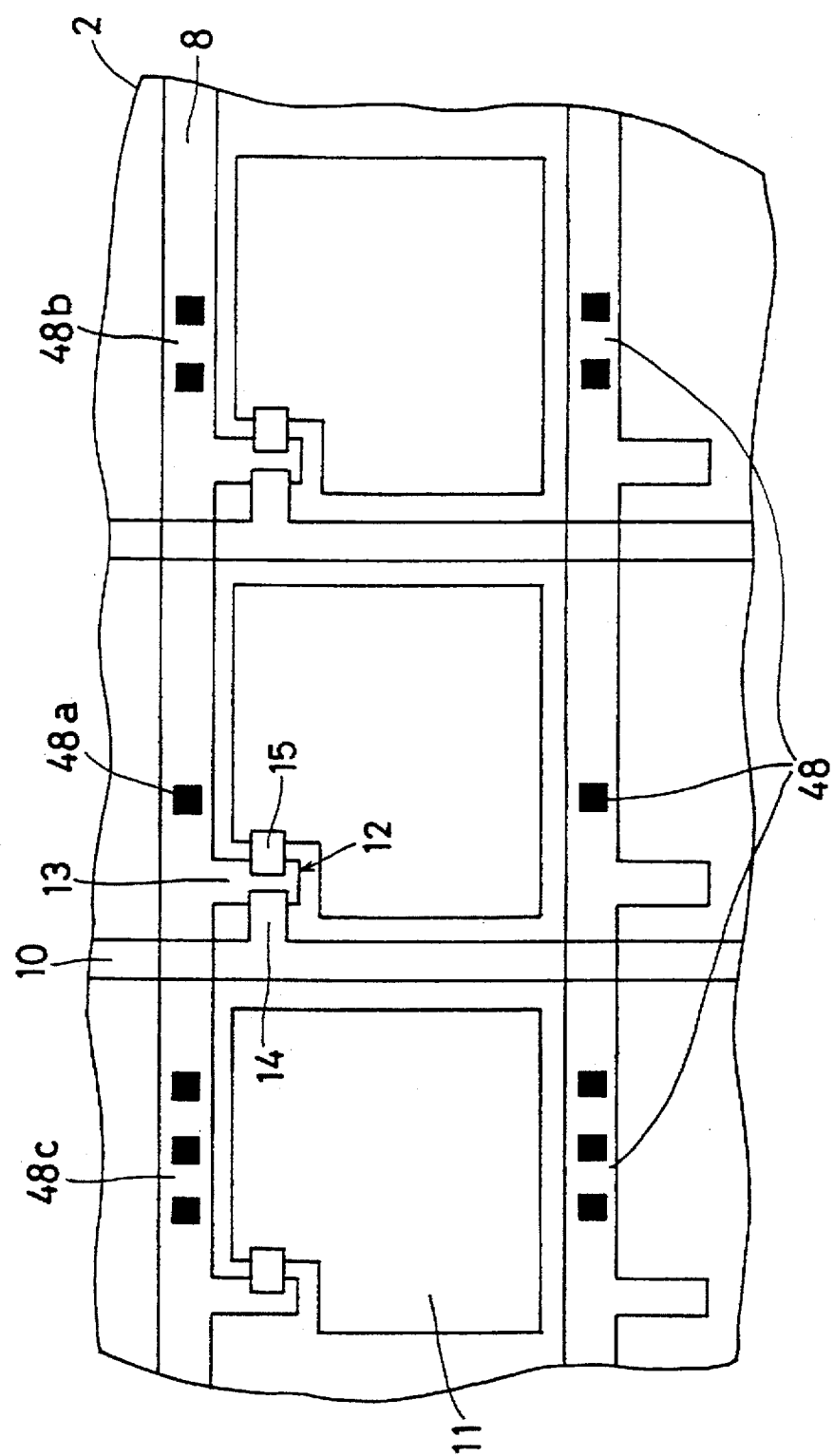
FIG. 12 is a plan view of a substrate member 2 in a liquid crystal display according to an eighth embodiment of the invention.

FIG. 12 is a plan view of the substrate member 2 in a liquid crystal display according to an eighth embodiment of the invention. The liquid crystal display of the eighth embodiment is characterized by the provision of identifying means 48 on the substrate member 2. In other respects, the structure is the same as the liquid crystal display 1 of the first embodiment, and like component elements are designated by like reference numerals.

The identifying means 48 is formed in the same manner as the identifying means 41 or 42, in regions on the liquid crystal layer side of the transparent substrate 7 where the gate wirings 8 or the source wirings 10 are formed. In FIG. 12, identifying means 48a to 48c, having different numbers of rectangular patterns like the identifying means 42, are formed in regions where the gate wirings 8 are formed. The gate wirings 8 are formed covering the identifying means 48a to 48c. Further, the TFT devices 12, source wirings 10, and pixel electrodes 11 are formed.

The identifying means 48 can thus be formed on the substrate member 2. In this case also, the display color of each pixel can be identified in the same manner as previously described. Accordingly, the test and correction can be performed in the same manner as previously described. This serves to simplify the manufacturing process.

Figure 13:
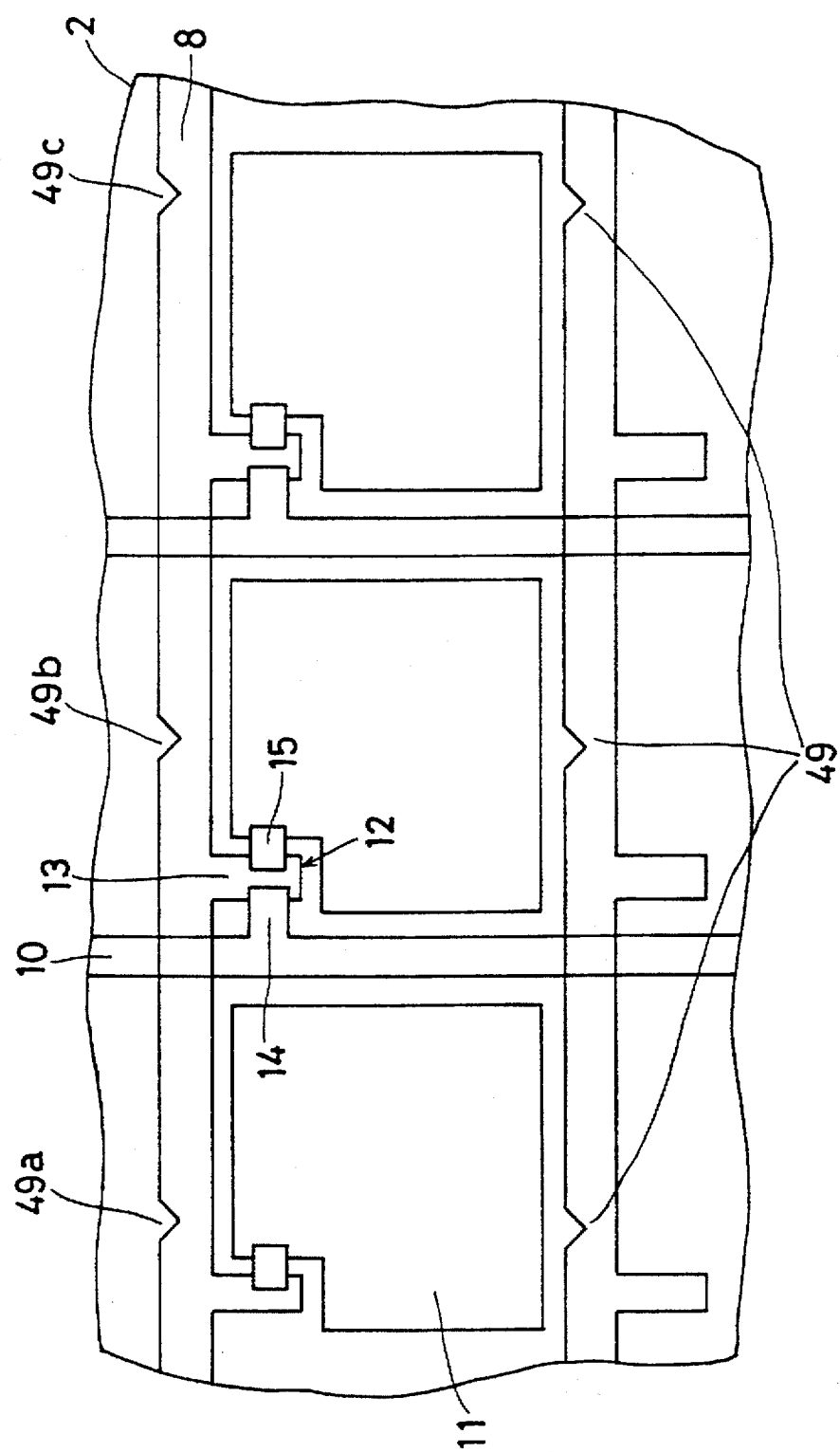
FIG. 13 is a plan view of a substrate member 2 in a liquid crystal display according to a ninth embodiment of the invention.

FIG. 13 is a plan view of the substrate member 2 in a liquid crystal display according to a ninth embodiment of the invention. The liquid crystal display of the ninth embodiment is characterized by the provision of identifying means 49 which, unlike the identifying means 48, is formed by patterning portions of the gate wirings 8 or source wirings 10. In other respects, the structure is the same as the liquid crystal display 1 of the first embodiment. In the ninth embodiment, notches formed in the gate wirings 8 serve as the identifying means 49. Such notches may be formed in the source wirings 10. It is also possible to form projections instead of the notches. The notches or projections constituting the identifying means 49 are each formed in a position which differs according to the display color of the pixel concerned.

With such identifying means 49 also, the display color of each pixel can be identified by the position of the identifying means 49, and the test and correction can be performed in the same manner as previously described.

Figure 14:
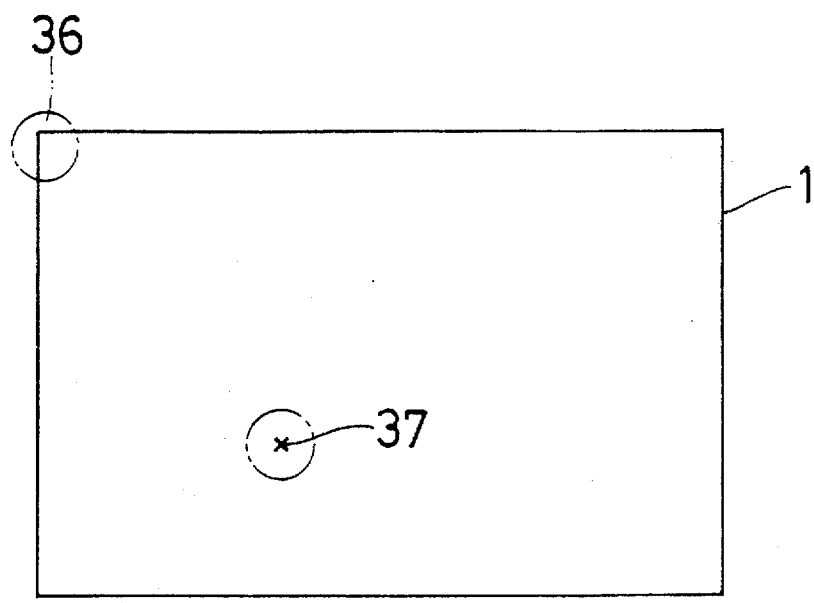
FIG. 14 is a plan view of the liquid crystal display 1, for explaining a method of obtaining the absolute position of a defective pixel.
Figure 15:
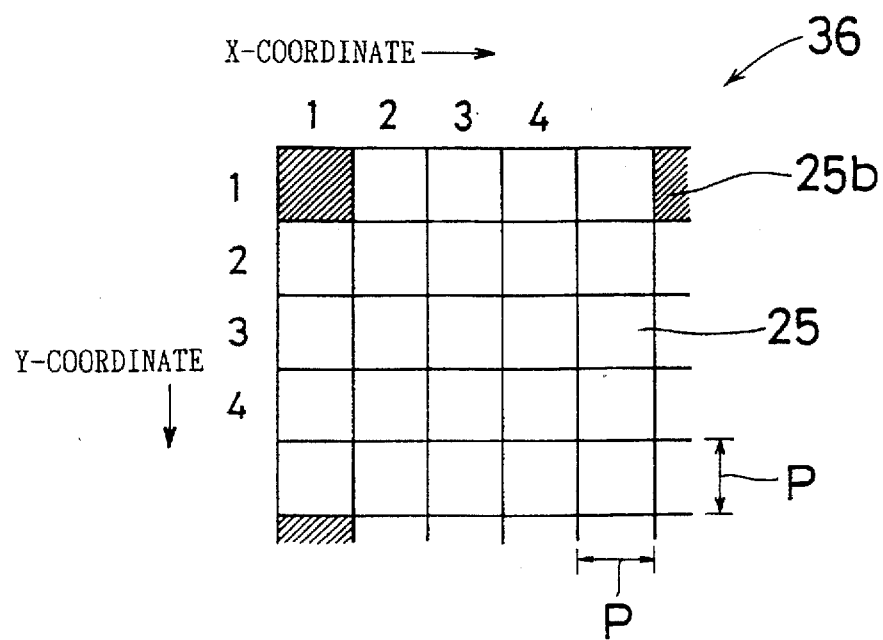
FIG. 15 is an enlarged plan view of a portion of the liquid crystal display 1, for explaining the method.
Figure 16:
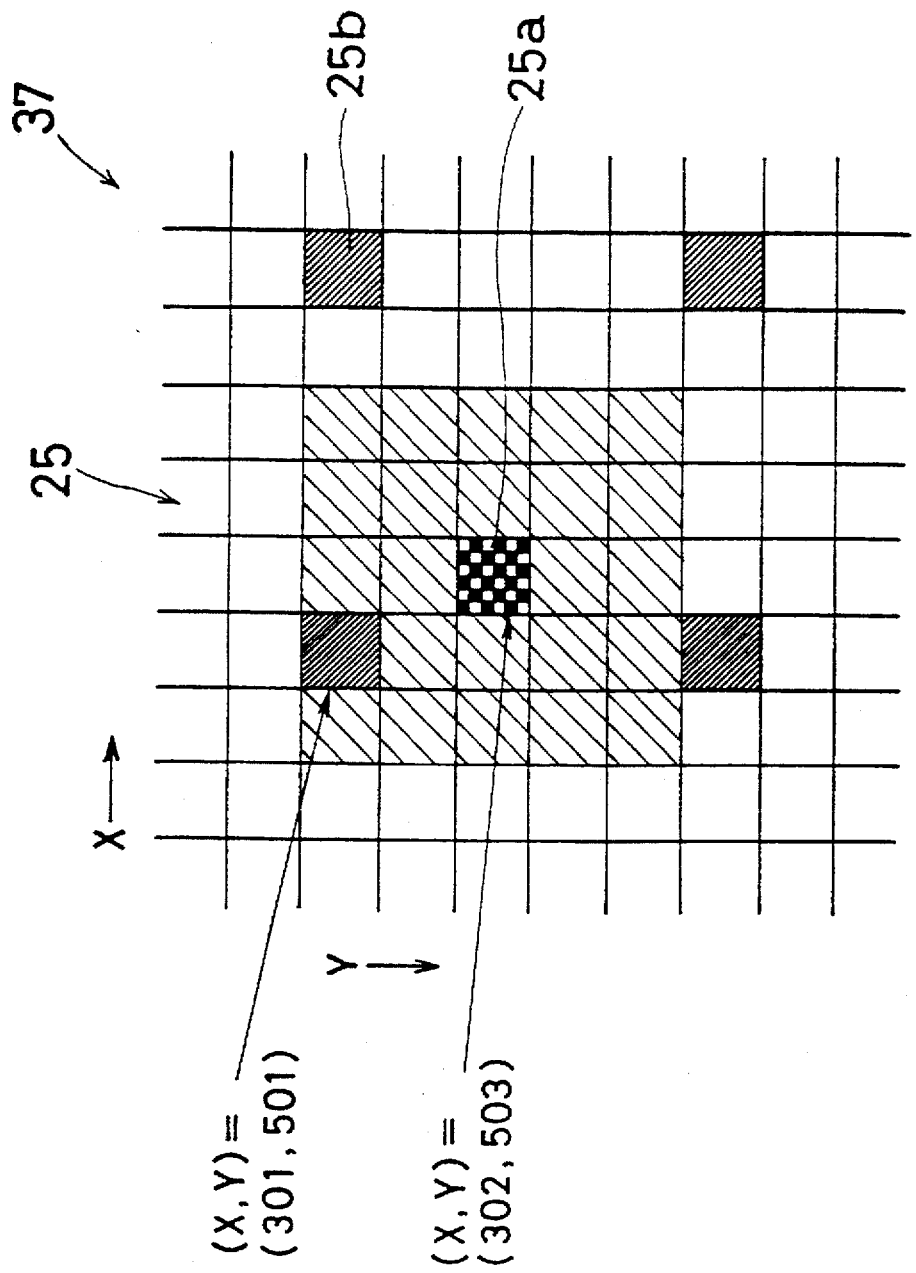
FIG. 16 is an enlarged plan view of a portion of the liquid crystal display 1 containing a defective pixel, for explaining the method.
Figure 17:
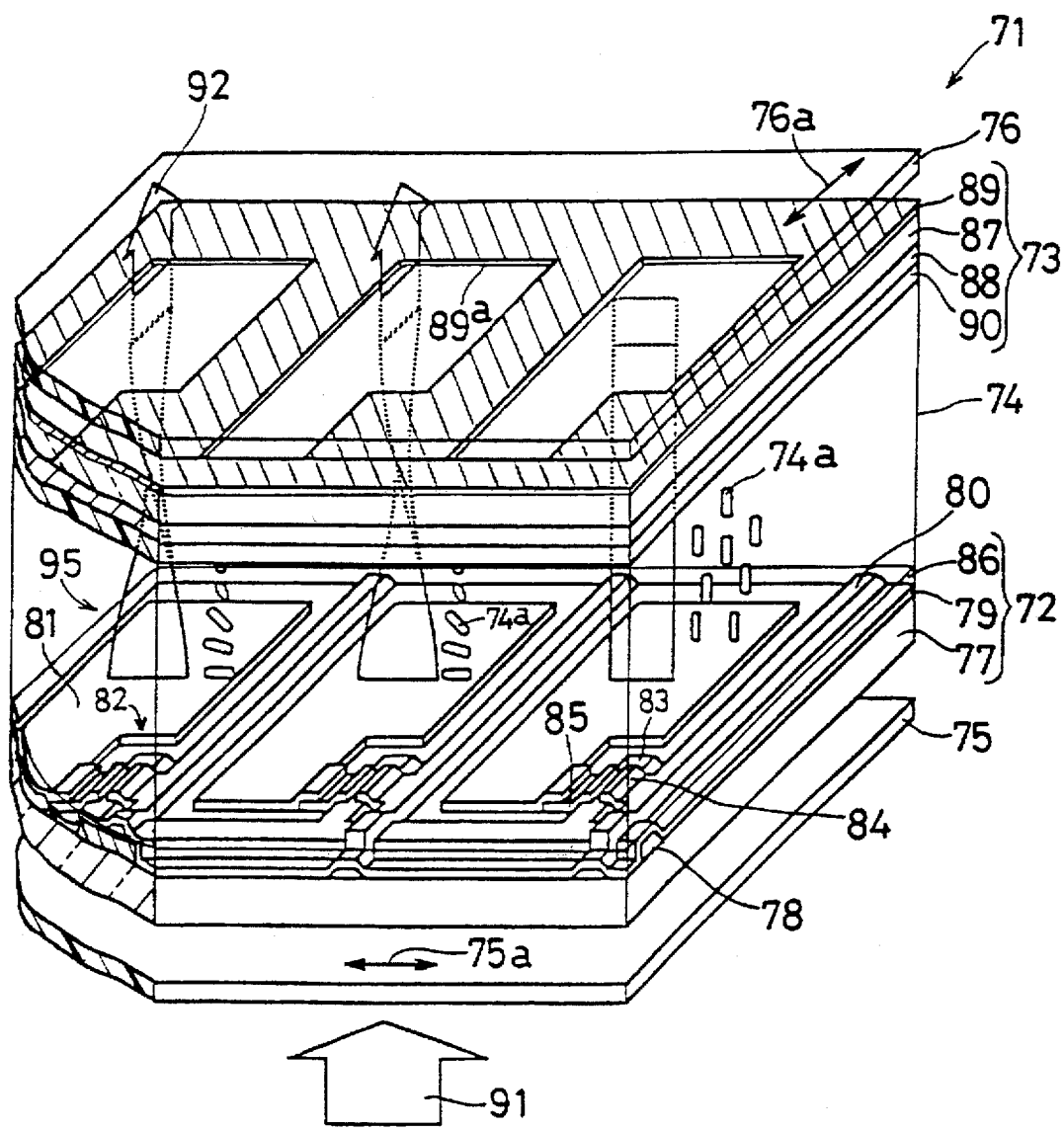
FIG. 17 is a partially cutaway view in perspective of a structure of a liquid crystal display 71 according to the prior art.
Figure 18:
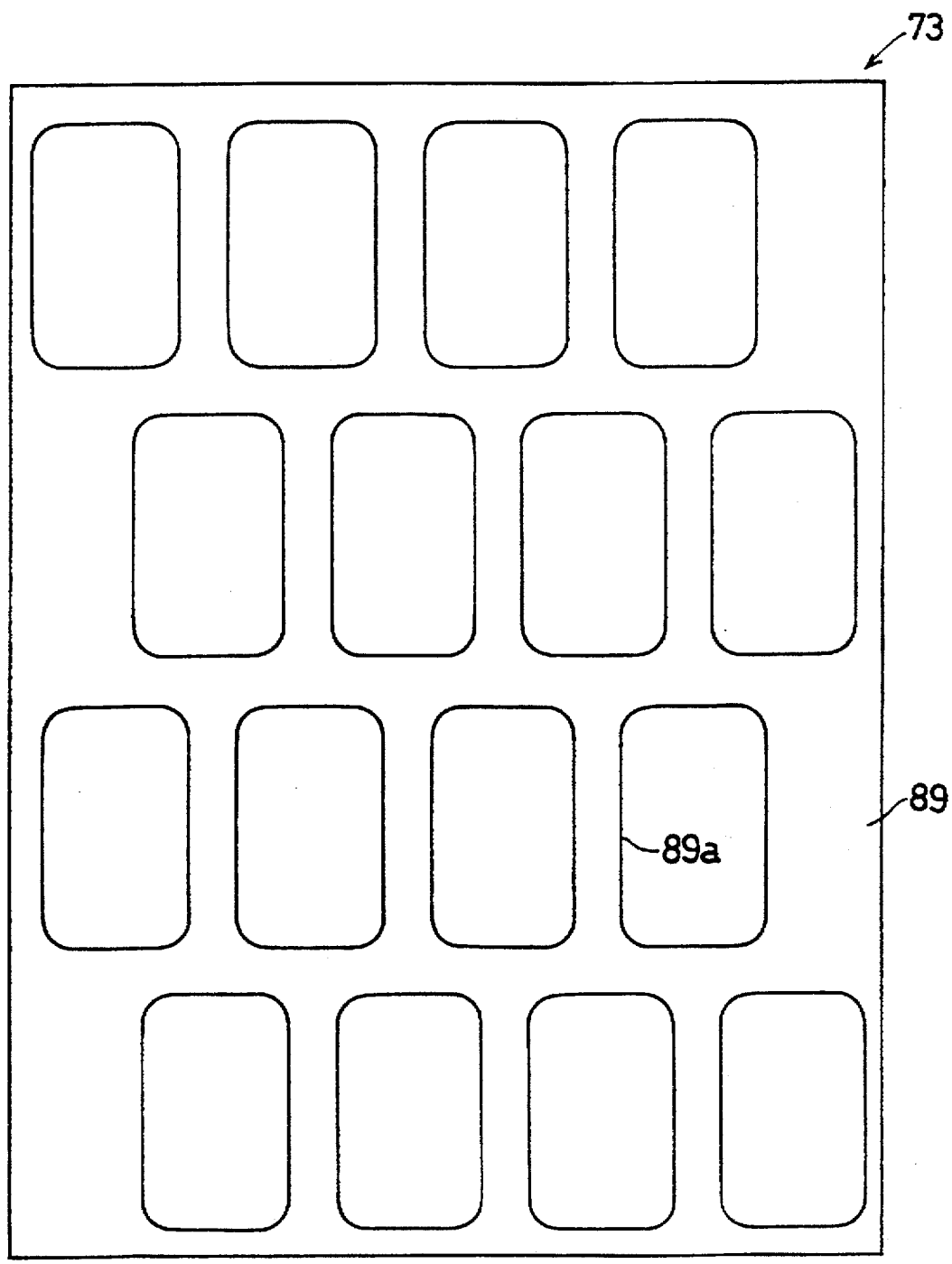
FIG. 18 is a plan view of a substrate member 73 in the liquid crystal device 71.
Figure 19:
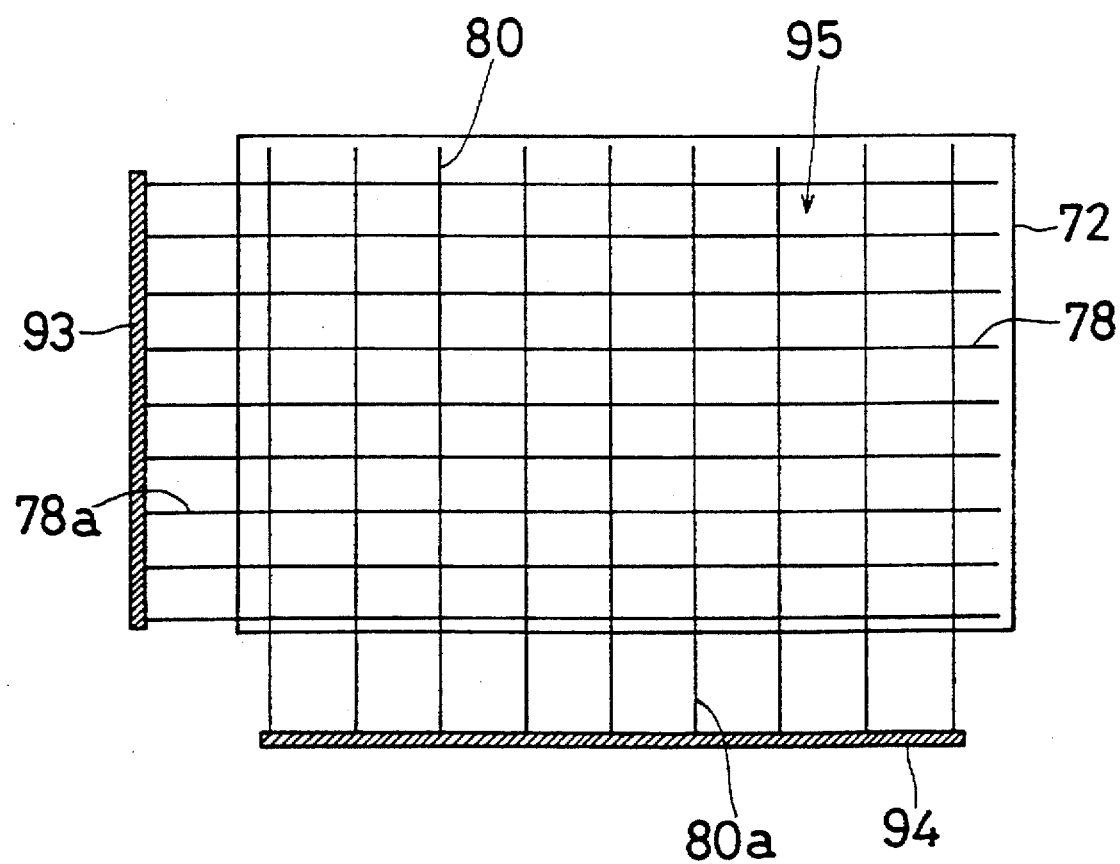
FIG. 19 is a schematic plan view of a substrate member 72 in the liquid crystal device 71.

FIG. 14 is a plan view of the liquid crystal display 1, for explaining a method of obtaining the absolute position of a defective pixel by using the identifying means 41 to 45 or 47 to 49. FIG. 15 is a plan view of a portion of the liquid crystal display 1 in enlarged form. FIG. 16 is a plan view showing in enlarged form a portion of the liquid crystal display 1 containing a defective pixel. To simplify the explanation of the method of obtaining the absolute position of a defective pixel, it is assumed here that one identifying means is formed for each block of 5×5 pixels. In the figure, the defective pixel is indicated at 25a and the pixel provided with the identifying means is indicated at 25b.

Suppose, for example, that the positional accuracy of the stage of test equipment on which the liquid crystal display 1 is mounted for a defect test is ±200 μm. In this situation, if the pixel pitch P is smaller than 200 μm, for example, if the pixel pitch P is 100 μm, the absolute coordinate position of the defective pixel cannot be obtained. To describe specifically, suppose that the defective pixel 25a is located at coordinate position (X, Y)=(302, 503), as shown in FIG. 16, with the pixel in the upper left-hand corner of the liquid crystal display 1 being taken as the reference with the coordinate position (X, Y)=(1, 1) as shown in FIG. 15. Since the positional accuracy of the stage is ±200 μm, as first described, it is not possible to determine the X, Y coordinates of the defective pixel 25a which is located within the range of 300<X<304 and 501<Y<505.

However, when the identifying means is provided one for each block of 5×5 pixels, as described above, the accurate position, (X, Y)=(302, 503), of the defective pixel 25a can be determined by making a correction with the pixel 25 at (X, Y)=(301, 501) as a tentative reference. In the above example, one identifying means is provided for each block of 5×5 pixels, but the number of identifying means and their distribution may be selected appropriately in accordance with the test method and test accuracy.

By thus providing the identifying means in a regular manner, or by providing the identifying means in an irregular manner, for example, when the test criteria are different between the center and edge portions of the screen, the absolute position of a pixel can be obtained with higher accuracy. This relaxes demands on the positional accuracy of the stage, and achieves a drastic reduction in the manufacturing cost of the stage itself. Furthermore, since the time required for positioning in testing can be reduced, test efficiency improves.

It will be appreciated that forming the identifying means, 41 to 45 and 47 to 49, in a display device having color filters, also falls within the scope of the invention. Since defects can be tested without the need for an expensive monochrome CCD (charge-coupled device) sensor, color CCD sensor, and peripheral circuitry, the test cost is reduced, and reliability in the judgment of pixel display colors improves.

The above embodiments have been described by taking a liquid crystal display as an example, but if an EL display device or a plasma display device is taken as an example, such examples also fall within the scope of the invention The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A matrix type display device comprising:
   one substrate member comprising gate wirings arranged at intervals in parallel to each other, source wirings arranged at right angles with the gate wirings so that insulation therebetween is maintained, a plurality of pixel electrodes arranged for each rectangular pixel formed by the intersection of the gate and source wirings, and switching devices which individually connect the pixel electrodes to the gate and source wirings; and
   another substrate member comprising a counter electrode facing the pixel electrodes, and a light-blocking member containing openings at least in regions thereof facing the pixel electrodes;
   wherein either the one substrate member or the another substrate member has identifying means for identifying specific pixels.

2. The matrix type display device of claim 1, wherein a display color for each pixel is predetermined, and the identifying means serves as a guide to recognize a display color or absolute position of a pixel with high accuracy.

3. The matrix type display device of claim 1, wherein the identifying means is provided on the another substrate member.

4. The matrix type display device of claim 3, wherein the light-blocking member is formed in such a manner as to cover the identifying means.

5. The matrix type display device of claim 3, wherein the identifying means is formed by patterning portions of the light-blocking member.

6. The matrix type display device of claim 5, wherein the identifying means is a notch formed in each opening of the light-blocking member.

7. The matrix type display device of claim 5, wherein the identifying means is a projection piece formed in each opening of the light-blocking member.

8. The matrix type display device of claim 1, wherein the identifying means is provided on the one substrate member.

9. The matrix type display device of claim 8, wherein the gate wirings or source wirings are formed in such a manner as to cover the identifying means.

10. The matrix type display device of claim 8, wherein the identifying means is formed by patterning portions of the gate wirings or source wirings.

11. The matrix type display device of claim 10, wherein the identifying means is a notch formed in each gate wiring or source wiring.

12. The matrix display device of claim 10, wherein the identifying means is a projection piece formed in each gate wiring or source wiring.

* * * * *